Figure 1:
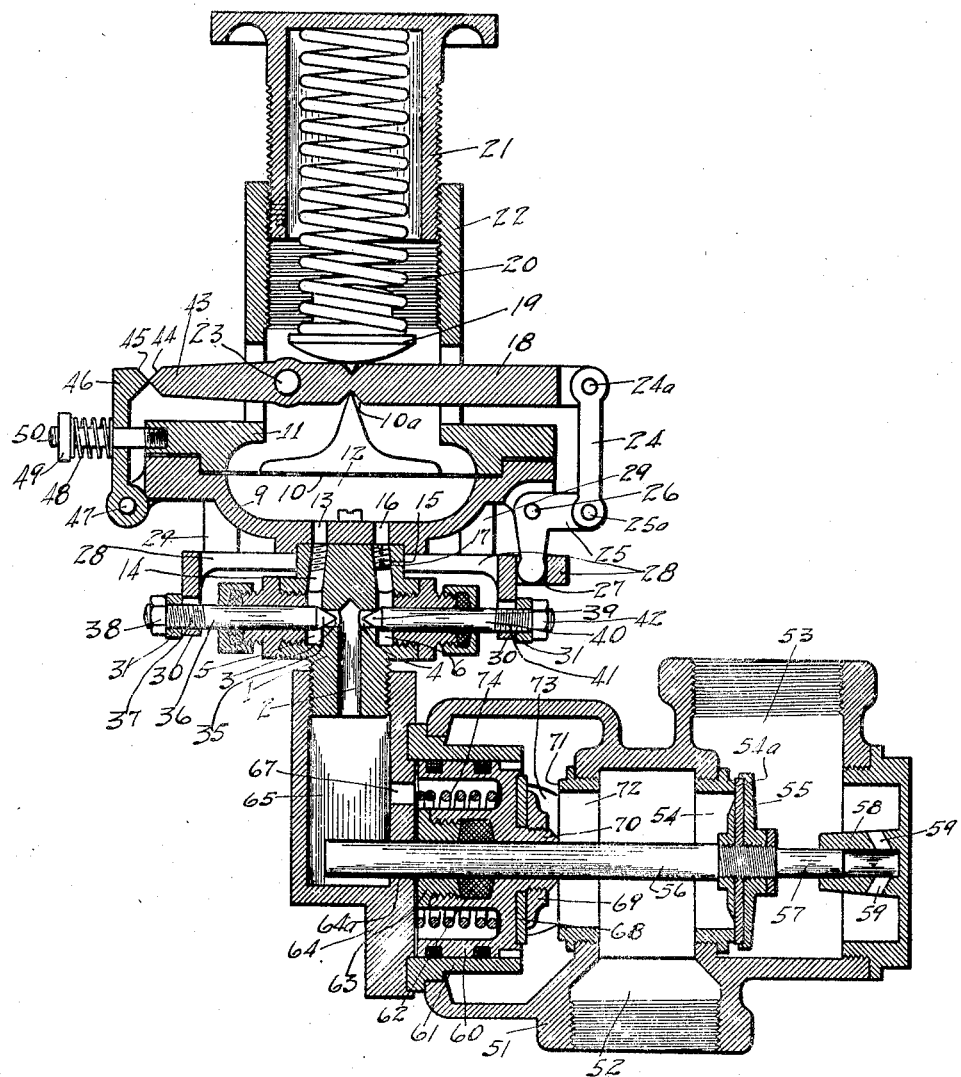

Oct. 13, 1925.

R. CONRADER 1,557,425

PRESSURE CONTROLLED VALVE MECHANISM

Filed Dec. 1, 1921  2 Sheets-Sheet 1

Inventor
Rudolph Conrader
By

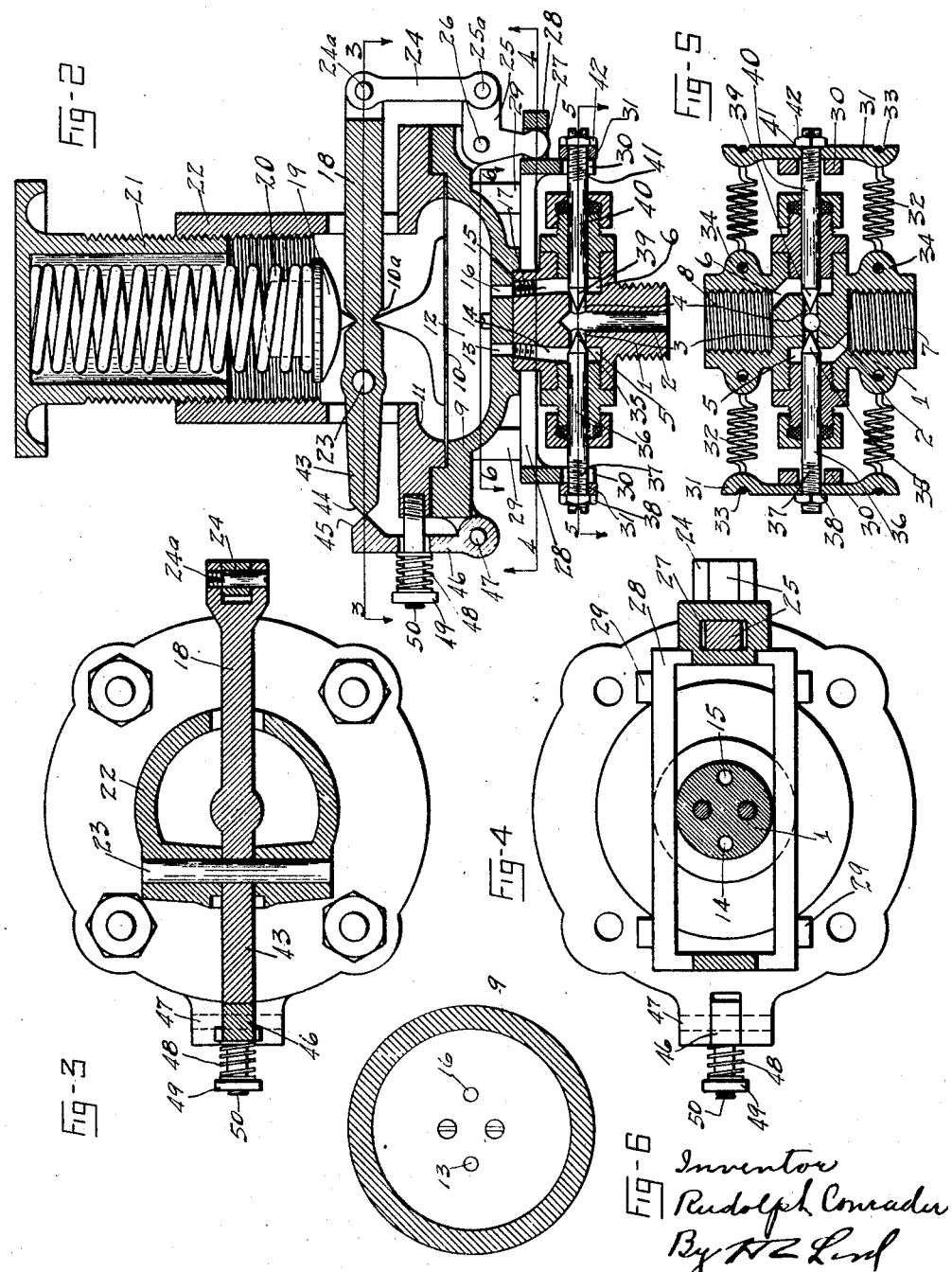

Patented Oct. 13, 1925.

1,557,425

UNITED STATES PATENT OFFICE.

RUDOLPH CONRADER, OF ERIE, PENNSYLVANIA.

PRESSURE-CONTROLLED VALVE MECHANISM.

Application filed December 1, 1921. Serial No. 519,163.

*To all whom it may concern:*

Be it known that I, RUDOLPH CONRADER, a citizen of the United States, residing at Erie, in the county of Erie and State of Pennsylvania, have invented new and useful Improvements in Pressure-Controlled Valve Mechanism, of which the following is a specification.

This invention is designed to act as a pilot valve being responsive to variations of pressure and controlling any desired instrument, ordinarily some instrument active in producing pressure acting on the pilot valve, one example of which is an unloader which is used as an exemplification of such an instrument.

The invention is illustrated in the accompany drawings as follows:—

Fig. 1 shows a central section through the pilot valve with an attached unloader.

Fig. 2 a similar section through the pilot valve.

Fig. 3 a section on the line 3—3 in Fig. 2.

Fig. 4 a section on the line 4—4 in Fig. 2.

Fig. 5 a section on the line 5—5 in Fig. 2.

Fig. 6 a section on the line 6—6 in Fig. 2.

1 marks the valve mechanism body. This is provided with a control passage 2 from which lead the inlet and exhaust ports 3 and 4, these ports leading to the inlet passage 5 and exhaust passage 6 respectively, the inlet passage leading from a fitting 7 adapted to be connected to a receiver or source of pressure and the exhaust passage 6 leading to a fitting 8 adapted to discharge direct to the atmosphere or to be returned to some convenient discharge, such as the intake of a pump. A diaphragm plate 9 is secured to the valve body and is provided with a diaphragm 10 which is clamped in place by the cover 11. A diaphragm chamber 12 is formed under the diaphragm and a passage 13 leads through the plate 9 to the diaphragm chamber from a passage 14 leading from the supply chamber 5. A similar passage 16 leads from a passage 15 communicating with the exhaust passage 6. The passage 15 is closed by a plug 17 and the passage 14 is shown having screw threads adapted to receive the plug.

By reversing this plug the action of the apparatus may be reversed, that is to say, the pressure being introduced under such conditions through the passage 8 and exhausted through the passage 7. With this change the pressure is introduced on the increase of pressure on the diaphragm and pressure is exhausted on a decrease whereas with the construction as shown pressure is relieved on the control passage 2 with an increase of pressure on the diaphragm and pressure admitted with a decrease of pressure on the diaphragm.

A lever 18 rests on the diaphragm in a bearing point $10^a$ and the spring base 19 rests on the lever at a point directly opposite the bearing point $10^a$, the lever having detents for receiving bearing points on the base 19 and the bearing point $10^a$. A spring 20 rests on the base 19 and is held against pressure by the follower 21. A projection 22 extends from the cover plate and is screw threaded to receive the follower 21 so that by adjusting the follower the spring pressure may be adjusted. This spring forms a counter-pressure device acting against the pressure in the diaphragm chamber 12.

The lever 18 is pivoted on a pin 23. A link 24 is secured to the lever 18 by means of a pin $24^a$ and to a bell crank 25 by means of a pin $25^a$. The bell crank is pivoted on a pin 26 carried by the diaphragm plate 9. One arm of the bell crank extends into an opening 27 on the end of a yoke 28. The yoke 28 extends each side of the body 1 and is held in position by guides 29 extending downwardly from the diaphragm plate 9. The yoke is provided with projections 30 which engage the cross heads 31. The cross heads are yieldingly held toward their inner position by springs 32 which extend from the notched ends 33 of the cross heads to the perforated ears 34 on the body. A needle valve 35 controls the port 3. It is provided with a stem 36 which has a screw-threaded end 37 screwed into one of the cross heads 31, this screw-thread permitting of the adjustment of the needle valve. A lock nut 38 is provided for locking the needle valve in adjustment. A similar needle valve 39 controls the port 4. It is provided with a stem 40 having a screw-threaded end 41 which is screwed into one of the cross heads 31 by means of which the needle valve may be adjusted and the lock nut 42 is provided for locking the stem in adjustment. The operation of the pilot valve so far as described is as follows: When the pressure on the diaphragm reaches above a pre-determined amount it overcomes the spring 20 lifting the lever and thus moving the yoke 28 to the right, this carrying with it the exhaust valve 39 and opening the control passage to the exhaust. The springs 32 operating on the valve 35 hold the valve 35 to its seat and the springs 32 on the yoke connected with the valve 39 yield to permit of the opening of this valve. When the pressure diminishes the counter-pressure forces the lever down and a reverse movement takes place and with a sufficient reduction the inlet valve 35 is opened introducing pressure to the control passage 2.

If desired the needle valves may be so adjusted that both are closed at the same time and thus there is a complete reversal. In some uses, however, such as with a structure where it is desired to intensify variations of pressure in the control passage the needle valves may be adjusted so that they do not seat simultaneously and under these conditions there is a variation of pressure incident to leakage past the exhaust valve as compared with the delivery past the inlet valve. Under these conditions it will be seen there is a variation of both the exhaust or leak passage and the inlet passage and the changes of pressure in the control passage will have a variation from approximately the maximum delivered to the inlet passage and atmospheric pressure.

In many instances it is desirable to vary the counter-pressure action particularly as the device reverses so that there will be some variation after an operation has been completed before a reversal will take place. This is provided in the present device as follows: The lever 18 has an extension 43 with a V-shaped cam 44 at its end. The cam 44 is engaged by a similar cam 45 at the end of a lever 46, this lever being pivoted at 47. A spring 48 exerts pressure on the lever 46 and the spring pressure is adjusted by a nut 49 on a screw 50 extending from the cover plate 11. This device operates as follows: When the lever moves to bring the point of the cam 44 past the point of the cam 45 the pressure of the cam 44 on the cam 45 then operates to assist in a further movement of the lever in the direction in which it is moving when the point of the cam 45 passes the point of the cam 44 but the reversal of this movement is opposed by the cam surface so that there must be a change in pressure to effect the reversal, the amount of change being controlled by the pressure exerted by the spring 48 so that this may be adjusted to any desired range. The purpose of this is to prevent too frequent reversals and thus to give stability to the device and also to prevent a balanced condition which sometimes leads to chattering of the controlled instrument. The unloader shown as the instrument operated by the pilot valve forms no part of the present invention but is added simply for the purpose of illustrating one of the uses of said pilot valve. It is provided with a body 51, inlet passage 52 and discharge passage 53. The inlet passage is designed to be connected with the discharge passage of a pump. It has a discharge passage 54 with a surrounding valve seat 54ª on which a discharge or non-return valve 55 seats. The valve 55 is carried by a stem 56, this stem having an extension 57 operating in a guide 58 having openings 59 for balancing the pressure on the extension. A plunger 60 operates in a cylinder 61 at the opposite side of the body 51. The stem 56 extends through the plunger 60, the plunger being provided with a packing 62 and a follower 63 being provided for closing the joint on the stem. The stem extends through an opening 64ª in a cover 64 on the cylinder 61 into a chamber 65. The chamber is screw-threaded at its end and the end of the body 1 having the control passage 2 is screwed into the chamber 65 and the chamber is subjected to pressure as it is controlled by the pilot valve. The chamber 65 communicates through an opening 67 with the cylinder 60 so that the chamber 65 and the cylinder 61 may be considered as one chamber. A valve disc 68 is secured on the plunger by a nut 69 operating on a screw-threaded extension 70 on the plunger and the disc operates on a valve seat 71 surrounding the passage 72 at the opposite side of the passage 52 from the passage 54.

When the pressure under the diaphragm is below the pre-determined pressure and the valve 35 is opened pressure is delivered to the chamber 65 and this maintains the plunger 60 in position to hold the disc 68 on the valve seat 71 and inasmuch as the discharge pressure at 53 will normally be the pressure that is delivered to the pilot valve the pressure on the stem 56 will be balanced and the valve 55 will remain open until the pressure on the pilot valve rises above the pre-determined desired pressure when the lifting of the diaphragm with the linkage above described will close the valve 35 and open the valve 39, thus exhausting the pressure from the chamber 65. When this happens the pressure on the stem 56 is unbalanced and the valve 55 will act as a check valve. When the pressure is reduced to a point where the difference in area of the plunger 60 and the valve seat 71 is such as to over-balance the plunger by reason of the pressure from the passage 52, the plunger moves opening the valve 68 allowing the pumped fluid through the passage 52 to pass through the passage 72 to a discharge 73. Ordinarily there would be friction in the discharge through the unloader to deliver some pressure through the receiver and this pressure operating on the plunger would immediately close the valve 68. To control this closure, however, at the beginning of the operation I have shown a spring 74 operating against the plunger, this spring being just of sufficient capacity to assure the closure of this valve 68 at the starting of the pump until there is an accumulation of pressure in the receiver or receptacle which may be controlled.

What I claim as new is:—

1. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; and means varying the resistance of the counter-pressure device with a reversal of the element.

2. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element connecting the controlled passage and the inlet passage with one movement of the element and the controlled passage with the exhaust passage with a reverse movement of the element; and means varying the resistance of the counter-pressure device with a reversal of the element.

3. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; and means varying the resistance of the counter-pressure device with a reversal of the element, said means resisting the movement of the element toward an intermediate point in both directions.

4. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; and means varying the resistance of the counter-pressure device with a reversal of the element, said means resisting the movement of the element toward an intermediate point in both directions and assisting the movement of the element in a direction away from said intermediate point.

5. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connection between the inlet and the controlled passage and the controlled passage and the exhaust reversing and varying said connections; and means varying the resistance of the counter-pressure device with a reversal of the element, said means comprising a member moving with the element and a relatively stationary member, one of said members having a cam surface and the other member yieldingly engaging the cam, said surface being shaped to resist the movement of the element toward an intermediate point in its travel in either direction.

6. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and exhaust reversing and varying said connections; and means carrying the resistance of the counter-pressure device with a reversal of the element, said means comprising a member moving with the element and a relatively stationary member, one of said members having a cam surface and the other member yieldingly engaging the cam, said surface being shaped to resist the movement of the element toward an intermediate point in its travel in either direction and to assist the movement in a direction away from said intermediate point.

7. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; means varying the resistance of the counter-pressure device with a reversal of the element; and an adjusting mechanism acting on said means to vary its effect.

8. In a pressure controlled valve machanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; means varying the resistance of the counter-pressure device with a reversal of the element; and an adjusting mechanism acting on said means to vary its resistance.

9. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; and means varying the resistance of the counter-pressure device with a reversal of the element, said means comprising a lever moving with the element and having a cam device having one member on the lever and the other relatively stationary, one member having a cam surface and the other member yieldingly engaging said surface to resist the movement of the lever as it reverses its direction.

10. In a pressure controlled valve mechanism, the combination of a motor having its movable element subjected to fluid pressure; a counter-pressure device acting on said element counter to the fluid pressure, said element being actuated by a variation of said fluid pressure; a valve mechanism having inlet, exhaust and controlled passages; a valve device actuated by and moving with the movable element controlling the connections between the inlet and the controlled passage and the controlled passage and the exhaust reversing and varying said connections; and means varying the resistance of the counter-pressure device with a reversal of the element, said means comprising a lever moving with the element and having a cam device having one member on the lever and the other relatively stationary, one member having a cam surface and the other member yieldingly engaging said surface to resist the movement of the lever as it reverses its direction and to assist the movement of the lever away from an intermediate point in the movement of the lever.

11. In a pressure controlled valve mechanism, the combination of a motor having its movable element subjected continuously to fluid pressure to be controlled; a counter-pressure device acting on said element counter to the fluid pressure, said element being actuated by a variation of said fluid pressure; a valve mechanism having inlet, exhaust and controlled passages; a valve device actuated by the movable element controlling the connections between the inlet and the controlled passage and the controlled passage and the exhaust reversing and varying said connections.

12. In a pressure controlled valve mechanism, the combination of a motor having its movable element subjected continuously to fluid pressure to be controlled; a counter-pressure device acting on said element counter to the fluid pressure, said element being actuated by a variation of said fluid pressure; a valve mechanism having inlet, exhaust and controlled passages; and a valve device actuated by the movable element connecting the controlled passage and the inlet passage with one movement of the element and the controlled passage with the exhaust passage with a reverse movement of the element.

13. In a pressure controlled valve mechanism, the combination of a motor having its movable element subjected continuously to fluid pressure to be controlled; a counter-pressure device acting on said element counter to the fluid pressure, said element being actuated by a variation of said fluid pressure a valve mechanism having inlet, exhaust and controlled passages; a valve device actuated by the movable element controlling the connections between the inlet and the controlled passage and the controlled passage and the exhaust reversing and varying said connections; connecting passages between the inlet and exhaust passages; and means for closing one of said connecting passages.

14. In a pressure controlled valve mechanism, the combination of a motor having its movable element subjected to fluid pressure to be controlled; a counter-pressure device acting on said element counter to the fluid pressure, said element being actuated by a variation of said fluid pressure; a valve mechanism having inlet, exhaust and controlled passages; and a valve device actuated by the movable element comprising two needle valves moving toward and from their seats, one valve seating in an opposite direction from the other, and one valve controlling the connection between the controlled passage and the inlet and the other valve controlling the connection between the controlled passage and the exhaust.

15. In a pressure controlled valve mechanism, the combination of a motor having its movable element subjected to fluid pressure to be controlled; a counter-pressure device acting on said element counter to the fluid pressure, said element being actuated by variations of said fluid pressure; a valve mechanism having inlet, exhaust and controlled passages; a valve device comprising two valves moving toward and from their seats, one valve seating in an opposite direction from the other, and one valve controlling the connection between the controlled passage and the inlet and the other valve controlling the connection between the controlled passage and the exhaust; actuating mechanism actuating said valves and comprising yielding means retaining one valve in closed position while opening the companion valve by a continued movement of the mechanism; and a connection between the actuating mechanism and the movable element said connection and mechanism compelling the valve to move with the element.

16. In a pressure controlled valve mechanism, the combination of a motor having its movable element subjected to fluid pressure; a counter-pressure device acting on said element; a valve mechanism having inlet, exhaust and controlled passages; a valve device actuated by the movable element comprising two valves moving toward and from their seats, one valve seating in an opposite direction from the other, and one valve controlling the connection between the controlled passage and the inlet and the other valve controlling the connection between the controlled passage and the exhaust; springs tending to close said valves; an actuating frame opening one valve against the tension of the spring while permitting the companion valve to remain closed; and a connection between the actuating frame and the element.

17. In a pressure controlled valve mechanism, the combination of a motor having its movable element subjected to fluid pressure; a counter-pressure device acting on said element; a valve mechanism having inlet, exhaust and controlled passages; a valve device actuated by the movable element comprising two valves moving toward and from their seats, one valve seating in an opposite direction from the other, and one valve controlling the connection between the controlled passage and the inlet and the other valve controlling the connection between the controlled passage and the exhaust; and means for varying the relative opening and closing of said valves with a given movement of the element.

18. In a pressure controlled valve mechanism, the combination of a motor having its movable element subjected to fluid pressure; a lever directly engaged by said element and acting as a guide therefor; a valve device comprising a controlled passage, an inlet passage and an exhaust passage; valves controlling the connection between the inlet and the controlled passage and the controlled passage and the exhaust and varying the same reversely; and a counter-pressure device acting on the lever directly opposite the point engaged by the element and resisting a movement of the element.

19. In a pressure controlled valve mechanism, the combination of a motor having its movable element subjected to pressure; a valve mechanism actuated by the lever; a valve device comprising a controlled passage, an inlet passage and an exhaust passage; valves controlling the connection between the inlet and the controlled passage and the controlled passage and the exhaust passage and varying the same reversely; and a lever directly engaged by the element and actuating the valve device, said lever compelling a movement of the valve device with a movement of the element and increasing the movement on the valve device over that of the element.

20. In a pressure controlled valve mechanism, the combination of a motor having its movable element subjected continuously to fluid pressure to be controlled; a lever directly engaged by said element; a counter-pressure device acting on the lever; a valve device comprising a controlled passage, an inlet passage and an exhaust passage; valves working in reverse directions operating on said connections; a yoke actuating said valves; and a lever connection between the first-mentioned lever and said yoke.

21. In a pressure controlled valve mechanism, the combination of a motor having its movable element subjected to fluid pressure; a lever directly engaged by said element; a counter-pressure device acting on the lever; a valve device comprising a controlled passage, an inlet passage and an exhaust passage; valves working in reverse directions operating on said connections; a yoke actuating said valves; and a bell crank connected with said lever and engaging said yoke.

22. In a pressure controlled valve mechanism, the combination of a motor having its movable element subjected to fluid pressure; a counter-pressure device acting on said element counter to the fluid pressure, said element being actuated by a variation of said fluid pressure; a valve mechanism controlled by and moving with said element; and means for retarding a reversal of said element and assisting its movement beyond an intermediate point in its travel.

23. In a pressure controlled valve mechanism, the combination of a motor having its movable element subjected to fluid pressure; a counter-pressure device acting on said element counter to the fluid pressure, said element being actuated by a variation of said fluid pressure; a valve mechanism controlled by and moving with said element; and means for adding to the resistance after reversal toward an intermediate point and then assisting a movement of the element away from the intermediate point.

24. In a pressure controlled valve mechanism, the combination of a motor having its movable element subjected to fluid pressure; a counter-pressure device acting on said element counter to the fluid pressure, said element being actuated by a variation of said fluid pressure; a valve mechanism controlled by and moving with said element; means for retarding a reversal of said element and assisting its movement beyond an intermediate point in its travel; and devices for adjusting said means to vary the range of retardation.

In testimony whereof I have hereunto set my hand.

RUDOLPH CONRADER.